Sept. 13, 1960     E. C. SWANSON     2,952,247
MANUALLY OPERABLE REVERSING VALVE
Original Filed May 15, 1956
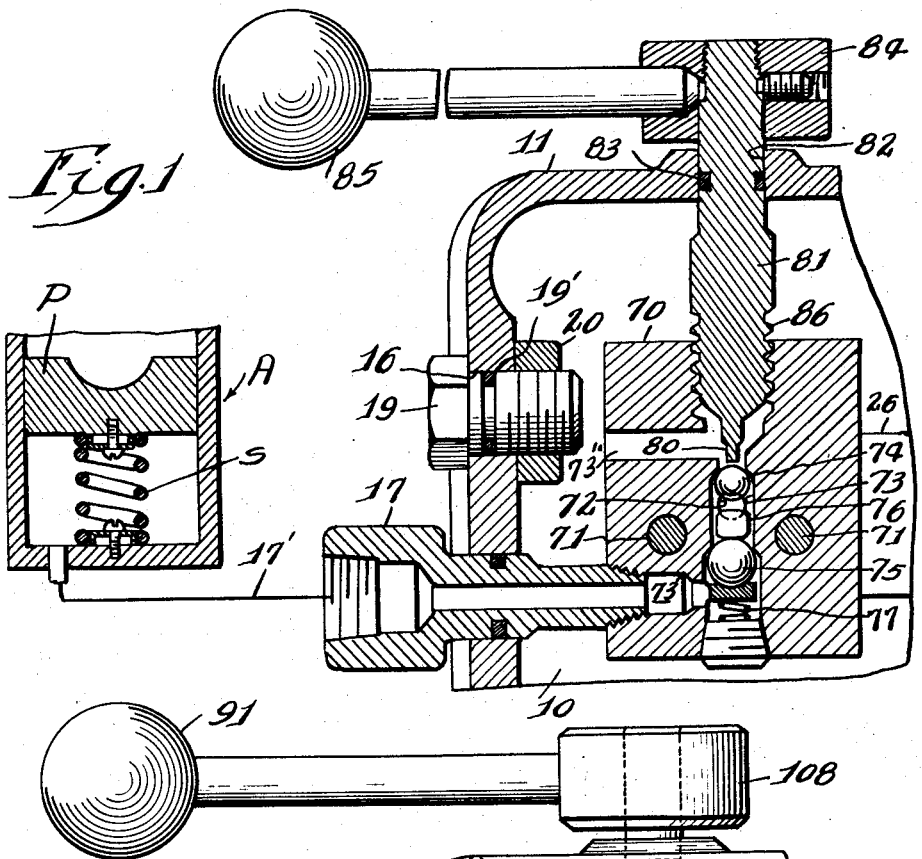
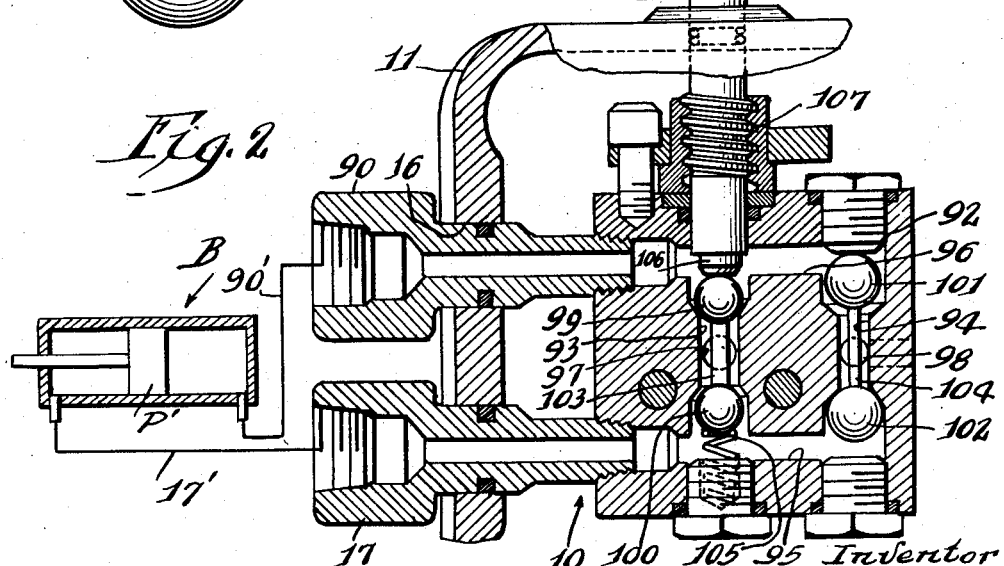
Inventor
Edwin C. Swanson
By Schraeder, Hofgren,
Brady & Wegner
Attorneys

United States Patent Office 2,952,247
Patented Sept. 13, 1960

2,952,247

MANUALLY OPERABLE REVERSING VALVE

Edwin C. Swanson, Rockford, Ill., assignor to Greenlee Bros. & Co., a corporation of Illinois Original application May 15, 1956, Ser. No. 584,955. Divided and this application Oct. 7, 1957, Ser. No. 688,627

4 Claims. (Cl. 121—46.5)

This invention relates to a reversing valve and more particularly to a manually controllable valve for a hydraulic circuit.

This application is a divisional application of applicant's copending application, Serial No. 584,955, filed May 15, 1956.

The general object of this invention is to provide a new and improved manually controllable reversing valve.

Another object is to provide a new and improved manually controllable valve operable to control fluid under pressure selectively to build up pressure in a hydraulic device to be controlled, to hold the pressure in the device, and to relieve the pressure in the device.

A further object of this invention is to provide such a valve including a housing with a passage adapted to be connected between an exhaust port and a hydraulic device to be controlled, a pair of check valves in the passage, a fluid pressure inlet to the passage intermediate the check valves, a spacer member between the check valves, one of the valves being normally opened and the other valve being normally closed by fluid pressure to provide a build up of pressure in a device being controlled, and a member operable to shift the normally closed valve a first distance to open the valve and provide a bypass for inlet pressure to the exhaust port with the normally open valve being closed to hold the pressure in the hydraulic device, and a further distance so that the spacer member opens the closed valve to relieve the pressure in said device.

Other objects, features and advantages will become apparent from the following detailed description taken in connection with the accompanying drawings, in which:

Figure 1 is a vertical sectional view taken through a valve embodying the invention; and Figure 2 is a vertical sectional view similar to Figure 1 showing a modification of the valve.

While the invention is herein described in preferred embodiments, they are not intended to limit the invention to the specific forms and arrangements shown, it being contemplated that various changes may be made by those skilled in the art without departing from the spirit of the appended claims.

As best shown in Figure 1, the manual valve includes a valve housing 70 disposed in a reservoir 10 defined by a housing 11 and secured therein by bolts 71. A pumping unit or other source of fluid under pressure has an outlet passage 72 formed in the housing 70 which opens into a stepped bore 73, the lower end of which connects by a port 73' with an outlet coupling 17, and the upper end of which opens into the reservoir through a port 73". A pair of ball check valves 74 and 75 are positioned in the stepped bore 73, one on each side of said fluid inlet passage 72 and are adapted to seat on steps formed in the bore 73. A spacer 76 is loosely disposed in the stepped bore 73 between the two ball check valves 74 and 75. The ball check valve 75 positioned adjacent the lower or outlet end of the bore 73 is normally urged into a closed position by a spring 77.

To control the passage of fluid from the pumping unit past the check valves, an operating member or plunger 80 is threadably mounted in the valve housing 70 so as to be selectively engageable with the ball check valve 74. The plunger 80 has a shaft portion 81 extending upwardly through a bore 82 formed in the housing 11 with a sealing ring 83 provided to prevent leakage of fluid from the reservoir. A collar 84 carrying a handle portion 85 is threadably secured to the externally projecting end of the shaft portion 81. By using a fast lead thread 86 for mounting the plunger 80 in the valve housing 70, a relatively small degree of rotation of the handle 85 will cause considerable vertical movement of the plunger 80 in the stepped bore 73.

As shown in Fig. 1, the outlet coupling 17 is connected to the closed end of a cylinder A by a line 17'. A piston P in the cylinder is adapted to be returned to the position shown by a spring s.

The manual valve handle 85 is adapted to be shifted between three positions, in the first, to permit a build up of pressure in the line 17', in a second, to hold a pressure in said line while bypassing fluid from passage 72 to the reservoir through a port 73", and in a third, to allow fluid in the line 17' to return to the reservoir through port 73" and release the pressure in the cylinder A. In the first position of the handle 85, the plunger 80 does not engage the ball check valve 74 so that fluid under pressure from passage 72 holds valve 74 seated and unseats the outlet ball check valve 75 against the action of the spring 77 and passes to the cylinder A. In the second position of the handle 85, the plunger 80 moves a limited distance downward to unseat the ball check valve 74 so as to bypass the fluid from the bore 73 through port 73" to the reservoir 10, the spring 77 in the outlet acting to close the outlet ball check valve 75 to hold the pressure in the cylinder A. In the third position of the handle 85, the plunger 80 is moved further downwardly against the ball check valve 74 sufficiently to cause the spacer member 76 to unseat the outlet ball check valve 75, thus allowing fluid in the cylinder A and that being supplied through passage 72 to pass to the reservoir through port 73".

It is believed evident that this manual valve is adapted for use when the fluid pressure is to be connected to a piston and cylinder device such as device A wherein either a spring s or gravity will return the piston to its initial position when the pressure in the cylinder is released.

When a pumping unit is to be used with a piston and cylinder device such as device B in Figure 2, wherein fluid pressure is necessary to move the piston P' in both directions in its cylinder, a modified form of the invention is used. This modification of the manual valve is shown in Figure 2 wherein a second outlet coupling 90 is fitted in a hole 16 in the housing 11. The two outlet couplings 17 and 90 are adapted to be connected by suitable conduits 17' and 90' to opposite ends of the piston and cylinder device B to be controlled. The valve in this modification has a handle 91, similar to the handle 85 in the first form, which is movable between three positions which may be called "advance," "neutral," and "reverse" to selectively provide fluid pressure in opposite ends of the cylinder and piston device B, respectively, first, to advance the piston (to the right in Figure 2), second, to hold it in its advanced position, and third, to return the piston to the position shown.

In this modification, a valve block 92 has formed therein a pair of spaced parallel stepped bores 93 and 94 connected together at their lower ends by passage 95 and at their upper ends by passage 96. Passages 95 and 96 communicate, respectively, with the two outlet couplings 17 and 90. A fluid passage 97 communicating with a pumping unit outlet or other pressure fluid source opens into the stepped bore 93 and a passage 98 communicating with the reservoir 10 opens into the stepped bore 94, A first pair of ball check valves 99 and 100 are disposed in the stepped bore 93 on opposite sides of the fluid inlet passage 97 and a second pair of ball check valves 101 and 102 are disposed in the stepped bore 94 on opposite sides of the passage 98. Spacer members 103 and 104 extend, respectively, between the first pair and the second pair of ball check valves to insure that when either one of each pair of check valves is closed the other check valve of the pair will be open. A spring 105 is operable to urge the lower ball check valve 100 to a closed position.

A valve operating member or plunger 106 is mounted in the valve block 92 by a fast lead thread 107, the handle 91 being secured to the upper end of the plunger 106 by a collar 108. With the handle 91 in its first position, the plunger 106 is positioned sufficiently above the upper check valve 99 so that the spring 105 is permitted to close the lower check valve 100 and through the spacer 103 to unseat the upper check valve 99 so as to allow the fluid under pressure to flow from the passage 97 past the upper check valve 99 and out the coupling 90 to one side of the piston P'. The pressure in the connecting passage 96 is sufficient to seat the upper check valve 101 in the reservoir bore 94 and consequently through the spacer 104 to unseat the lower check valve 102 to allow fluid to pass from the other side of the piston P' through line 17', coupling 17 and passage 95, past the lower check valve 102 to the reservoir through the passage 98.

When the handle 91 is shifted to its second or neutral position, the plunger 106 is shifted downwardly against the upper ball check 99 far enough to cause the spacer 103 to unseat the lower ball check 100 but not far enough to seat the upper ball check 99. Thus, in this neutral position of the handle 91, the fluid under pressure is permitted to flow from pump outlet passage 97 past both ball checks 99 and 100 and to the reservoir past the ball checks 101 and 102 which are both open as a result of equal pressures in the connecting passages 95 and 96.

When the handle 91 is shifted to its third position (shown in Figure 2), the plunger 106 moves downwardly sufficiently to seat the upper check valve 99 and through the spacer member 103 to open the lower check valve 100 so that pumped fluid may pass through the coupling 17 to the other side of the piston P'. The pressure in the passage 95 acts to close the check valve 102 and through the spacer 104 to open the check valve 101 and to allow the fluid in the right-hand side of the cylinder B to pass to the reservoir through line 90, passage 96, the upper portion of the stepped bore 94 and passage 98.

I claim:

1. A valve comprising: a valve housing having a pair of parallel passages with a fluid pressure inlet opening into one passage and an exhaust outlet leading from the other passage, a pair of ball check valves disposed in each passage, the ball check valves of each pair being arranged on opposite sides of and seating toward said inlet and said outlet, respectively, a spacer member disposed in each passage between the ball check valves of each pair and having a length greater than the distance between the valve seats in the passage, means connecting the adjacent ends of said parallel passages, means forming first and second connections for a hydraulic device to be controlled by the valve and communicating one each with said adjacent connected ends of said two passages, means for alternately seating and unseating the inlet passage pair of check valves to selectively control the passage of fluid from the inlet to said two connections including a spring acting to seat one check valve, and a manually movable stem mounted in the housing operable to close the other of said check valves and through one of said spacer members to open the spring closed check valve, said outlet pair of check valves being automatically alternately seated by the inlet pressure to selectively provide a passage for fluid from said two connections to said exhaust outlet, and a handle secured to the stem externally of the housing to selectively control the movement of said stem.

2. A valve comprising: a valve housing having a pair of parallel passages with a pressure fluid inlet opening into one passage and an exhaust outlet leading from the other passage, a pair of ball check valves disposed in each passage, the ball check valves of each pair being arranged on opposite sides of and seating toward said inlet and said outlet respectively, a spacer member disposed in each passage between the ball check valves of each pair and having a length greater than the distance between the valve seats in the passage, means connecting the adjacent ends of said parallel passages, means for controlling the inlet passage pair of check valves including a spring acting to seat one check valve and a selectively movable stem in the housing cooperable with the other check valve and having a first position disengaging said other check valve thereby enabling said spring to close said one check valve and open said other check valve, said stem being movable to a second position engaging said other check valve to move both check valves to partially open positions, and said stem being movable to a third position closing said other check valve and opening said one check valve, and means for retaining said stem in each of said three positions, the valves of said outlet pair of check valves being movable to a first position wherein the valve adjacent said one, spring pressed inlet valve is open and the other outlet valve is closed when said stem is in said first position, a second position wherein both outlet valves are partially open when said stem is in said second position, and a third position wherein said one outlet valve is closed and said other outlet valve is open when said stem is in the third position.

3. A valve comprising: a valve housing having a pair of parallel passages with a pressure fluid inlet opening into one passage and an exhaust outlet leading from the other passage, a pair of ball check valves disposed in each passage, the ball check valves of each pair being arranged on opposite sides of and seating toward said inlet and said outlet respectively, a spacer member disposed in each passage between the ball check valves of each pair and having a length greater than the distance between the valve seats in the passage, means connecting the adjacent ends of said parallel passages, means forming first and second connections for a hydraulic device to be controlled by the valve and communicating one each with said adjacent connected ends of said two passages, means controlling the inlet passage pair of check valves to selectively move one valve to open position and the other valve to closed position or alternatively to move said one valve to closed position and said other valve to open position, the outlet passage pair of check valves being automatically controlled by fluid pressure in the adjacent connected ends of said two passages to move the one outlet valve adjacent said one inlet valve to closed position and to move the other outlet valve to open position when said one inlet valve is open and said other inlet valve is closed, and to move said one outlet valve to open position and said other outlet valve to closed position when said one inlet valve is closed and said other inlet valve is open.

4. A valve comprising: a valve housing having a pair of parallel passages with a pressure fluid inlet opening into one passage and an exhaust outlet leading from the other passage, a pair of ball check valves disposed in each passage, the ball check valves of each pair being arranged on opposite sides of and seating toward said inlet and said outlet respectively, a spacer member disposed in each passage between the ball check valves of each pair and having a length greater than the distance between the valve seats in the passage, means connecting the adjacent ends of said parallel passages, means forming first and second connections for a hydraulic device to be controlled by the valve and communicating one each with said adjacent connected ends of said two passages, means controlling the inlet passage pair of check valves including a spring acting to seat one check valve and a manually operable valve stem threadably mounted in the housing to engage the other inlet valve and movable from a first position wherein the one spring pressed inlet valve is closed and the other inlet valve is opened, a second position wherein both inlet valves are open, and a third position wherein said one inlet valve is open and said other inlet valve is closed, said outlet passage pair of valves being automatically controlled by fluid in the adjacent connected ends of said two passages to move the one outlet valve adjacent said one inlet valve to open position and said other outlet valve to closed position when said valve stem is in said first position, to move both outlet valves to open positions when said valve stem is in said second position and to move said one outlet valve to closed position and said other outlet valve to open position when said stem is in said third position.

References Cited in the file of this patent

UNITED STATES PATENTS

| | | |
|---|---|---|
| 925,673 | Zook | June 22, 1909 |
| 2,526,402 | Pfauser et al. | Oct. 17, 1950 |
| 2,629,363 | McClay | Feb. 24, 1953 |
| 2,660,255 | Schindler | Nov. 24, 1953 |

FOREIGN PATENTS

| | | |
|---|---|---|
| 445,559 | Great Britain | Apr. 14, 1936 |